United States Patent
Kikuchi et al.

(10) Patent No.: US 9,260,563 B2
(45) Date of Patent: Feb. 16, 2016

(54) PROCESS FOR PRODUCTION OF POLYAMIDE

(75) Inventors: Minoru Kikuchi, Niigata (JP); Katsumi Shinohara, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 271 days.

(21) Appl. No.: 13/512,179

(22) PCT Filed: Nov. 24, 2010

(86) PCT No.: PCT/JP2010/070857
§ 371 (c)(1),
(2), (4) Date: Jun. 27, 2012

(87) PCT Pub. No.: WO2011/065346
PCT Pub. Date: Jun. 3, 2011

(65) Prior Publication Data
US 2012/0271031 A1    Oct. 25, 2012

(30) Foreign Application Priority Data

Nov. 27, 2009  (JP) .............................. 2009-269761

(51) Int. Cl.
*C08G 69/28*    (2006.01)
*C08G 69/26*    (2006.01)

(52) U.S. Cl.
CPC .............. *C08G 69/265* (2013.01); *C08G 69/28* (2013.01)

(58) Field of Classification Search
CPC ...................................................... C08G 69/28
See application file for complete search history.

(56) References Cited

U.S. PATENT DOCUMENTS

| | | |
|---|---|---|
| 4,433,136 A | 2/1984 | Miyamoto et al. |
| 4,438,257 A | 3/1984 | Miyamoto et al. |
| 2001/0012883 A1 | 8/2001 | Tanaka et al. |
| 2008/0262193 A1 * | 10/2008 | Kurose et al. ................. 528/335 |
| 2009/0299027 A1 | 12/2009 | Kurose et al. |
| 2009/0299028 A1 | 12/2009 | Kikuchi et al. |

FOREIGN PATENT DOCUMENTS

| | | |
|---|---|---|
| EP | 1 980 585 A2 | 10/2008 |
| JP | 43 22874 | 10/1968 |
| JP | 48 12390 | 2/1973 |
| JP | 57 200420 | 12/1982 |
| JP | 58 111829 | 7/1983 |
| JP | 1 14925 | 3/1989 |
| JP | 06-207004 | 7/1994 |
| JP | 07-324130 | 12/1995 |
| JP | 2001 200053 | 7/2001 |
| JP | 2002060486 A * | 2/2002 |
| JP | 2003-327691 A | 11/2003 |
| JP | 2005 139219 | 6/2005 |
| JP | 2005139219 A * | 6/2005 |
| JP | 2010 7055 | 1/2010 |

OTHER PUBLICATIONS

U.S. Appl. No. 13/512,214, filed Jun. 27, 2012, Kanda, et al.
International Search Report Issued Jan. 18, 2011 in PCT/JP10/70857 Filed Nov. 24, 2010.
Extended European Search Report issued Jul. 14, 2014, in European Patent Application No. 10833192.7.

* cited by examiner

*Primary Examiner* — Rachel Kahn
(74) *Attorney, Agent, or Firm* — Oblon, McClelland, Maier & Neustadt, L.L.P.

(57) ABSTRACT

An economical batchwise production method of polyamide with good quality by the polycondensation in which a diamine component including 70 mol % or more of a xylylenediamine which includes 20 mol % or more of p-xylylenediamine is added to a dicarboxylic acid component in a batchwise reaction tank equipped with a partial condenser. The diamine component is added while maintaining the whole reaction system in fluid state under pressure. The pressure is reduced during the time that the molar ratio is within a specific range while continuing the addition.

10 Claims, No Drawings

PROCESS FOR PRODUCTION OF POLYAMIDE

TECHNICAL FIELD

The present invention relates to a method of producing polyamide by the polycondensation of a dicarboxylic acid component and a diamine component in the absence of a solvent. More specifically, the present invention relates to an efficient method of producing a polyamide with uniform quality by the polycondensation of a diamine component comprising p-xylylenediamine and a dicarboxylic acid component in a batchwise reaction tank equipped with a partial condenser.

BACKGROUND ART

In a common batchwise production method of polyamide using a nylon salt or its aqueous solution, the aqueous solution of nylon salt is heated under pressure in a single reaction vessel to allow the polymerization to proceed in a homogeneous phase while preventing the diamine component from escaping by evaporation. After fixing the diamine component, the water vapor in the system is gradually released to reduce the pressure finally to atmospheric pressure or reduced pressure, thereby completing the polymerization. In this method, since an aqueous solution of nylon salt with a concentration of about 50 wt % is generally used, a large amount of solvent water and the condensation water eliminated by condensation must be removed. Therefore, a countermeasure should be taken against various disadvantages, such as foaming, solidification of polymer due to the evaporation latent heat of water, heat degradation of polyamide which is adhered to the inner wall of reaction vessel due to a large change of liquid level during the reaction. In addition, this method requires a large amount of heat energy for removing a large amount of water and the single batch yield of polyamide is low. Therefore, this method involves many technical and economical problems. These problems can be fairly solved by the production method wherein the nylon salt is supplied as the raw material (Patent Documents 1 and 2). However, the proposed method requires additional steps for isolating and purifying the nylon salt, reducing the production efficiency.

Patent Document 3 discloses a polymerization method without using a nylon salt or its aqueous solution, in which the reaction is allowed to proceed by adding a diamine component containing a small amount of water dropwise to a dicarboxylic acid component at 220° C. under atmospheric pressure. Patent Documents 4 and 5 disclose methods wherein the reaction is allowed to proceed by adding dropwise a diamine component to a dicarboxylic acid component under atmospheric pressure. Although technically and economically advantageous, these methods involve a problem attributable to the addition of the diamine component to the dicarboxylic acid component under atmospheric pressure.

Since the molten dicarboxylic acid component is sublimable, the sublimated dicarboxylic acid component deposits on the ceiling of the polymerization apparatus. Also, the sublimated dicarboxylic acid component adheres to the inner wall of pipes connected to the upper portion of the polymerization apparatus, for example, the inlet for adding additives, inlet for adding the diamine component, and the pipe for introducing the vapor mainly containing the steam of condensation water which is eliminated by the polymerization reaction from the reaction tank to a partial condenser, and further adheres to the inside of the partial condenser. Most of the adhered sublimate of the dicarboxylic acid component is washed away in the polymerization step by the dissolution in the condensation water eliminated by the polymerization. The dicarboxylic acid component sublimates when the polymerization apparatus contains only the molten dicarboxylic acid component and also during the addition of the diamine component if the fixation of the dicarboxylic acid component is insufficient.

The sublimate of the dicarboxylic acid component adhered to the polymerization apparatus reacts with the diamine component brought by the vapor of the condensation water eliminated by polycondensation, thereby forming nylon salt or oligomer. As compared with the salt of m-xylylenediamine and a dicarboxylic acid, the salt of p-xylylenediamine and a dicarboxylic acid component is less soluble in water. Therefore, the amount of the salt which does not dissolve in the condensation water increases as the content of p-xylylenediamine in the diamine component increases. The amidation of the salt proceeds during the repeated batchwise productions to form oligomer, thereby further reducing the solubility in water. The adhered matter is subjected to a long-term heat history. If the adhered matter falls into the polymer during its production, the resultant final product, such as film, bottle, and monofilament, may suffer quality defects, such as gelation. Of the parts of the reaction apparatus, the nylon salt and oligomer adhere and accumulate most exceedingly in the pipe which introduces the vapor mainly containing the condensation water eliminated by the polymerization from the reaction tank to the partial condenser and in the partial condenser. If continuously accumulated, the pipe and the partial condenser are clogged, making it difficult to continuously repeat the batchwise production. In the production of polyamide from a diamine component and a dicarboxylic acid component, it is very important to control the mole balance to achieve the desired degree of polymerization. However, the amount of the accumulated salt and oligomer in the reaction tank varies batch to batch, making it difficult to precisely control the mole balance. Thus, the method of adding the diamine component to the dicarboxylic acid component has many disadvantages to producing polyamide with uniform and good quality.

Patent Document 6 discloses to add a whole amount of diamine component to a dicarboxylic acid component in an extremely short time and allow the reaction to proceed under pressure. The proposed method involves various disadvantages, which are attributable to the addition of a whole amount of diamine component in an extremely short time. Since a large amount of condensation water is eliminated in a short time, a countermeasure should be taken against foaming, change of liquid level, solidification of polymer due to the evaporation latent heat of water, and escape of monomers by evaporation. Particularly, a high pressure is needed. Therefore, it takes a long time to reduce the pressure for allowing the reaction to proceed, because the pressure should be reduced while preventing foaming. During the operation of reducing the pressure, the polyamide is exposed to high temperature for a long time, this promoting the oxidative degradation of polyamide molecules to cause yellowing. In addition, a large amount of heat energy is required in a short time for removing a large amount of the condensation water which is eliminated in a short time and maintaining the reaction system at a temperature enough to keep the whole reaction system in fluid condition, thereby requiring a heating means excessively large in view of the amount of the produced polyamide. Thus, the proposed method involves many technical and economical problems.

Patent Document 6 further discloses a production method of polyamide by the polycondensation of a dicarboxylic acid component and a diamine component under pressure, in which after completing the polycondensation under pressure, the pressure is decreased to allow the polymerization to further proceed. In this method, the polyamide is exposed to high temperature until the pressure is lowered to the desired level and the deterioration of the polyamide molecule by oxidation is promoted to cause yellowing. In contrast to the proposed method, it is recommended to allow the degree of polymerization to quickly reach the desired level after the whole diamine component is added to the dicarboxylic acid component.

The polycondensation of the dicarboxylic acid component and the diamine component under pressure involves a problem of taking a long time for decreasing the pressure while preventing the foaming. To shorten the process time after completing the addition of the diamine component, it has been known to control the inner pressure of the reaction system so that the pressure at the time the addition of the diamine component is completed is lowered. However, in the polycondensation under a constant pressure, to prevent the adhesion of the nylon salt and oligomer to the reaction system and effectively wash away the adhered matter with the condensation water eliminated by the polycondensation of the diamine component and the dicarboxylic acid, the polycondensation should be conducted under the lowest pressure enough to keep the effect of preventing the adhesion or under a controlled inner pressure of the reaction system. Patent Document 6 describes nothing about a method wherein the pressure is reduced while preventing the escape of monomers by evaporation during the polycondensation, i.e., during the addition of the diamine component to the dicarboxylic acid component.

Patent Document 7 discloses a method in which a diamine component comprising m-xylylenediamine and p-xylylenediamine is added to adipic acid, while decreasing the concentration of p-xylylenediamine in the diamine component in a later stage of the reaction. The proposed method uses different diamine components containing the ingredients in different proportions, thereby increasing the number of equipments to be used. In addition, the diamine component being adding is changed to another during the reaction, this complicating the operation. Thus, the proposed method cannot be said as an efficient method.

Therefore, it has been demanded to provide an efficient method of producing polyamide with uniform properties by the polycondensation of a diamine component comprising p-xylylenediamine and a dicarboxylic acid component.

PRIOR ART DOCUMENTS

Patent Documents

Patent Document 1: JP 33-15700B
Patent Document 2: JP 43-22874B
Patent Document 3: JP 48-12390A
Patent Document 4: JP 1-14925B
Patent Document 5: JP 58-111829A
Patent Document 6: JP 6-207004A
Patent Document 7: JP 7-324130A

DISCLOSURE OF THE INVENTION

Problems to be Solved by the Invention

An object of the invention is to provide a batchwise production method of polyamide, which is capable of producing polyamide with good quality economically by the polycondensation of a diamine component comprising p- xylylenediamine and a dicarboxylic acid component in a batchwise reaction tank equipped with a partial condenser.

Means for Solving the Problems

The inventors have made extensive research on the batchwise production of polyamide in which the polycondensation is carried out by adding a diamine component comprising a 70 mol % or more of xylylenediamine which comprises 20 mol % or more of p-xylylenediamine into a dicarboxylic acid component in a batchwise reaction tank equipped with a partial condenser. As a result thereof, the inventors have found that a polyamide with good quality is produced economically by adding the diamine component under pressure while maintaining the whole reaction system in fluid state and reducing the pressure during the time that the molar ratio is within a specific range, while continuing the addition.

Namely, the present invention relates to a method of producing polyamide by polycondensation of a diamine component and a dicarboxylic acid component in a batchwise reaction tank equipped with a partial condenser in the absence of a solvent, the diamine component comprising 70 mol % or more of a xylylenediamine which comprises 20 mol % or more of p-xylylenediamine, wherein the method comprises the following steps (1) to (3):

(1) a step of charging the dicarboxylic acid component into the reaction tank and increasing an inner pressure of the reaction tank to 0.2 MPaG or higher;

(2) a step of adding the diamine component to the dicarboxylic acid component continuously or intermittently until a molar ratio (B/A) of the diamine component (B) to the charged dicarboxylic acid component (A) reaches 0.60, while maintaining the inner pressure of the reaction tank at 0.2 MPaG or higher and maintaining a whole reaction system in fluid state; and (3) a step of reducing the inner pressure of the reaction tank to less than 0.2 MPaG during the time that the molar ratio (B/A) of the diamine component (B) to the charged dicarboxylic acid component (A) is within a range of 0.60 to 0.95, while maintaining the whole reaction system in fluid state and adding the diamine component to the dicarboxylic acid component continuously or intermittently.

Effects of the Invention

The process of producing polyamide of the invention has the following beneficial effects:

(i) since the copolyamide resin is produced by the polycondensation reaction of a diamine component and a dicarboxylic acid component without using solvent, particularly water, the yield of polyamide per volume is high and the reaction time is short;

(ii) since the adhesion of nylon salt and oligomer to the reaction system and the escape of the diamine component by evaporation are prevented, the precise control of the mole balance, i.e., the precise control of the degree of polymerization is easy, polyamide with uniform and good quality is obtained;

(iii) since the clogging of partial condenser and the accumulation of polymer in the reaction tank are prevented, the batchwise production can be repeated continuously;

(iv) since the time the polyamide is exposed to high temperature is shortened, the yellowing of polyamide is reduced and the reaction time is shortened; and (v) since a highly pressure-resistant polymerization apparatus, a partial condenser with complicated design, and an excessively large heating means are not needed, the production apparatus is inexpensive.

Mode for Carrying out the Invention

Examples of the dicarboxylic acid component used in the production method of the invention include an aliphatic dicarboxylic acid, such as succinic acid, glutaric acid, adipic acid, pimelic acid, suberic acid, azelaic acid, sebacic acid, undecanedioic acid, and dodecanedioic acid, and aromatic dicarboxylic acid, such as terephthalic acid, isophthalic acid, and 2,6-naphthalenedicarboxylic acid, with adipic acid being preferred in view of the practical performance of the resulting polyamide. These acids may be used alone or in combination. From the same point of view, the dicarboxylic acid component comprises preferably 70 mol % or more and more preferably 90 mol % or more of adipic acid.

In view of practical performance of the resulting polyamide, the diamine component used in the production method of the invention preferably comprises 70 mol % or more and preferably 90 mol % or more of xylylenediamine. In view of the crystallizability of the resulting polyamide, the xylylenediamine comprises 20 mol % or more and preferably 30 mol % or more of p-xylylenediamine. The xylylenediamine preferably consists of two diamines, i.e., m-xylylenediamine and p-xylylenediamine. The content of p-xylylenediamine in the xylylenediamine is preferably 20 to 65 mol % and more preferably 30 to 50 mol %. The diamine component may further contain other diamine in an amount of 30 mol % or less of the total diamine, which is selected from aliphatic diamines, such as tetramethylenediamine, pentamethylenediamine, hexamethylenediamine, 1,7-diaminoheptane, 1,8-diaminooctane, 1,9-diaminononane, and 1,10-diamino decane; aromatic diamines, such as m-phenylenediamine and p-phenylenediamine; and alicyclic diamines, such as 1,3-bis(aminomethyl)cyclohexane and 1,4-bis(aminomethyl)cyclohexane.

The component for forming polyamide other than the diamine component and the dicarboxylic acid component may include, but not specifically limited to, lactams, such as caprolactam, valerolactam, laurolactam, and undecalactam; and aminocarboxylic acids, such as 11-aminoundecanoic acid and 12-aminododecanoic acid. These components may be used alone or in combination of two or more.

To prevent the discoloration during the melt polymerization, a phosphorus compound may be added to the copolyamide resin. Examples of the phosphorus compound include a hypophosphorous compound, such as hypophosphorous acid and hypophosphorous salt; a phosphorous compound, such as phosphorous acid, phosphorous salt, and phosphorous ester; and a phosphoric compound, such as phosphoric acid, phosphoric salt, and phosphoric ester. Examples of the hypophosphorous salt include potassium hypophosphite, sodium hypophosphite, calcium hypophosphite, magnesium hypophosphite, manganese hypophosphite, nickel hypophosphite, and cobalt hypophosphite. Examples of the phosphorous salt include potassium phosphite, sodium phosphite, calcium phosphite, magnesium phosphite, manganese phosphite, nickel phosphite, and cobalt phosphite. Examples of the phosphorous ester include methyl phosphite, ethyl phosphite, isopropyl phosphite, butyl phosphite, hexyl phosphite, isodecyl phosphite, decyl phosphite, stearyl phosphite, and phenyl phosphite. Examples of the phosphoric salt include potassium phosphate, sodium phosphate, calcium phosphate, magnesium phosphate, manganese phosphate, nickel phosphate, and cobalt phosphate. Examples of the phosphoric ester include methyl phosphate, ethyl phosphate, isopropyl phosphate, butyl phosphate, hexyl phosphate, isodecyl phosphate, decyl phosphate, stearyl phosphate, and phenyl phosphate. These phosphorus compounds may be used alone or in combination. The phosphorus compound can be added to the raw material of polyamide, i.e., the diamine component or the dicarboxylic acid component or can be added to the reaction system, although not limited thereto.

The production of polyamide is conducted in the absence of a solvent in view of economical advantage. The term "in the absence of a solvent" referred to herein means to conduct the production in the complete absence of a solvent and also in the presence of a solvent in a small amount not adversely affect the effect of the invention.

The batchwise reaction tank used in the invention is a pressure-resistant type equipped with a partial condenser and optionally with a stirring device. To prevent the escape of the diamine component and the dicarboxylic acid component by evaporation, the heat transfer surface of the partial condenser is preferably temperature-controllable.

The mole balance of raw materials charged in the reaction tank is not specifically limited, because a polyamide having any desired mole balance (inclusive of diamine component rich, dicarboxylic acid component rich, and equimolar) can be produced in the production method of the invention. The mole balance of raw materials in the reaction tank is controlled, for example, by metering the molten dicarboxylic acid component together with the melting tank, supplying the molten dicarboxylic acid to the reaction tank, and adding the diamine component in the reserve tank to the reaction system while metering the amount being added. The diamine component and the dicarboxylic acid component can be metered by means of a weighing meter, such as a load cell and a balance.

The method of producing polyamide of the invention comprises the following steps (1) to (3).

Step (1)

In the step (1), the dicarboxylic acid component is charged into the reaction tank and then the inner pressure of the reaction tank is raised to 0.2 MPaG or higher. By increasing the inner pressure of the reaction system, the evaporation of the dicarboxylic acid component is prevented. Therefore, the accumulated amount of the dicarboxylic acid adhered to the polymerization apparatus is reduced and the effect of preventing the formation of the nylon salt and oligomer during the synthesis is obtained. In view of avoiding the discoloration of polyamide by oxidation, it is preferable to replace the inner atmosphere of the reaction tank sufficiently with an inert gas, such as nitrogen, before charging the dicarboxylic acid component into the reaction tank. It is also preferable to melt the dicarboxylic acid in an inert gas atmosphere. The dicarboxylic acid component may be melted in the reaction tank by heating to its melting point or higher. Alternatively, the dicarboxylic acid component may be melted in a different tank for only melting (melting tank) by heating and then the molten dicarboxylic acid component is charged into the reaction tank. In view of increasing the working efficiency of the reaction tank, the use of the melting tank is recommended.

It is recommended to increase the inner pressure of the reaction tank to 0.2 MPaG or higher before initiating the addition of the diamine component to the dicarboxylic acid component in the reaction tank. To decrease the evaporation of the dicarboxylic acid component, the inner pressure is preferably increased to 0.2 MPaG or higher immediately after charging the dicarboxylic acid component into the reaction tank. The inner pressure is increased by introducing inert gas, such as nitrogen, or steam into the reaction tank. From the view point mentioned above, the inner pressure is increased preferably to 0.2 to 0.4 MPaG, although depending upon the diamine component and the dicarboxylic acid component to be used.

Step (2)

In the step (2), the diamine component is added to the dicarboxylic acid component continuously or intermittently until the molar ratio (B/A) of the diamine component (B) to the charged dicarboxylic acid component (A) reaches 0.60, while maintaining the inner pressure of the reaction tank at 0.2 MPaG or higher, preferably within a range of 0.2 to 0.4 MPaG and maintaining the whole reaction system in fluid state. After increasing the pressure in the step (1), the inner pressure is maintained at 0.2 MPaG or higher, as mentioned above. To prevent the escape of the diamine component from the reaction system in a large amount, the inner pressure reached in the step (1) is preferably regulated within the above range and also within a range not adversely affects the operation and the quality. The inner pressure reached in the step (1) within the above range may be maintained constant. After increasing to 0.2 MPaG or higher in the step (1), the inner pressure of the reaction tank is preferably controlled within a range not adversely affects the operation and the quality or maintained constant until the pressure is reduced in the step (3) described below. The term "maintained constant" referred to herein does not necessarily means to maintain the pressure absolutely constant, and the pressure may vary to some extent as long as the effect of the invention is obtained.

By increasing the inner pressure of the reaction system, the amount of the diamine component and the dicarboxylic acid component being evaporated is reduced, this reducing the molar fraction of the diamine component and the dicarboxylic acid component in the vapor phase and also reducing the accumulated amount of the nylon salt and oligomer adhered to the reaction tank. In addition, since the temperatures of the vapor phase and the liquid mainly including the diamine component and returning to the reaction system are increased, the oligomer is melted and effectively washed away with the returning liquid, thereby further reducing the accumulated amount of the adhered oligomer. Father, the dew point of water is increased because the saturated vapor pressure of water is increased, thereby increasing the solubility to water of the nylon salt. Thus, in the present invention, the adhesion of the nylon salt and oligomer to the reaction system during the reaction is reduced and the adhered salt and oligomer is effectively washed away by the condensation water eliminated by the polycondensation of the diamine component and the dicarboxylic acid component, thereby preventing the adhesion.

During the addition of the diamine component to the dicarboxylic acid component, the dicarboxylic acid is heated preferably to 150° C. or higher within which the amidation reaction is allowed to proceed, and simultaneously, the by-produced oligomer and/or low molecular weight polyamide is preferably in molten state to maintain the whole reaction system in fluid state. The addition is carried out preferably at 180 to 340° C.

The temperature raising rate depends upon the heat of amidation reaction, the latent heat of evaporation of the condensation water, and the heat supplied. Therefore, the addition speed of the diamine component is suitably regulated so that the temperature of the reaction mixture at the completion of the addition is preferably equal to or higher than the melting point of polyamide resin but less than (the melting point +35° C.), more preferably less than (the melting point +15° C.), and still more preferably equal to or higher than (the melting point +5 DC) but less than (the melting point +10 DC). The melting point referred to herein is the temperature of heat absorption peak attributable to the heat of fusion of crystal which is observed in differential scanning calorimetry (DSC), etc. The melting point of the reaction system can be determined at any time by DSC, etc.

The addition is carried out by adding the diamine component to the molten dicarboxylic acid component in the reaction tank continuously or intermittently while stirring and preferably maintaining the whole reaction mixture in fluid state by gradually raising the temperature of the reaction mixture to the temperature mentioned above.

When adding the diamine component continuously, the addition speed of the diamine component is suitably selected so as to prevent the foaming due to the condensation water eliminated by the polycondensation, and the diamine component is added preferably over 30 min to 4 h and more preferably over 60 min to 2 h. Although the addition in excessively short period of time is economically advantageous, the liquid level is elevated by the foaming caused by a large amount of condensation water eliminated in short period of time and the polymer adheres to the side wall of the reaction tank and the stirring blade. The adhered polymer does not melt in the subsequent batchwise productions, and therefore, the adhered amount is increased and the adhered polymer is subjected to heat history longer with increasing number of repeated batchwise productions. If the accumulated mass of adhered polymer falls and enters into the polymer, the quality of the resulting product is deteriorated and the stirring blade may be broken. If the diamine component is added over extremely long period of time, the problems of increasing heat history and reducing the productivity may be caused. Therefore, it is generally preferred to complete the addition within 4 h. When adding the diamine component intermittently, the total time of the intermittent addition is preferably selected from the range as mentioned with respect to the continuous addition.

The condensation water which is eliminated as the condensation reaction proceeds is evaporated off out of the reaction system through a partial condenser and then a cooler. To prevent the amidation reaction in the partial condenser, the temperature of the vapor-side outlet of the partial condenser is preferably controlled to 155° C. or lower. The temperature of the vapor-side outlet is preferably controlled to 155° C. or lower also in the step (3) and the reaction step after the step (3) and more preferably controlled to 155° C. or lower within a range of from the dew point of water to a temperature 5° C. higher than the dew point. The diamine component evaporated together with the condensation water and the vaporized dicarboxylic acid component are separated from the steam in the partial condenser and returned to the reaction tank. In a continuous production with a temperature of the vapor-side outlet exceeding 155° C., the nylon salt or oligomer which is not dissolved in the returning liquid (condensation water and diamine component) is subjected to amidation into polymer in the partial condenser, to further reduce the solubility. The amount of the polymer accumulated in the partial condenser increases with increasing number of repeated batchwise productions and the partial condenser is finally clogged, thereby making it difficult to continuously repeat the batchwise production. To effectively evaporate off the condensation water, which is eliminated as the reaction proceeds, from the reaction system, the temperature of the vapor-side outlet of the partial condenser is preferably controlled to 155° C. or lower within a range of from the dew point of water to a temperature 5° C. higher than the dew point. If the temperature of the vapor-side outlet is excessively higher that the dew point of water, since the amount of returning liquid formed in the partial condenser is reduced, the effect of washing away the nylon salt and oligomer adhered to the partial condenser may be not expected. In addition, the escape of the diamine component out of the reaction system in a large amount is difficult to avoid, making it difficult to control the mole balance in some cases.

Therefore, it is recommended to suitably select the reaction conditions so as to regulate the temperature of the vapor-side outlet within a preferred range. For example, the temperature of the vapor-side outlet is controlled within a range of 143 to 148° C. when the inner pressure of the reaction tank is 0.3 MPaG.

Step (3)

In the step (3), the inner pressure of the reaction tank is reduced to less than 0.2 MPaG and preferably 0.1 MPaG or lower during the time that the molar ratio (B/A) of the diamine component (B) to the charged dicarboxylic acid component (A) is within a range of 0.60 to 0.95, while maintaining the whole reaction system in fluid state and adding the diamine component to the dicarboxylic acid component continuously or intermittently. The pressure reducing speed is preferably selected so as not to exceed the condensing capacity of the partial condenser. If the pressure is reduced in a speed exceeding the condensing capacity of the partial condenser, the separating efficiency of the partial condenser is reduced, to make the escape of the diamine component out of the reaction system in a large amount difficult to avoid and make the control of the mole balance difficult in some cases. The inner pressure of the reaction tank is preferably reduced while the molar ratio (B/A) is within a range of 0.60 to 0.95, although depending upon the size of the reaction tank and the pressure. When the molar ratio (B/A) is less than 0.60, the non-reacted diamine component and dicarboxylic acid component remain in the reaction system in large amounts. Therefore, if the reduction of the pressure is started when the molar ratio (B/A) is less than 0.60, the evaporated amounts of the diamine component and the dicarboxylic acid component are increased to increase the molar fractions of the diamine component and the dicarboxylic acid component in the vapor phase, this in turn unfavorably increasing the accumulated amount of the adhered nylon salt or oligomer in the reaction system. If initiating the reduction of the pressure when the molar ratio (B/A) is higher than 0.95, the liquid level is elevated largely due to the foaming because the molten polymer is highly viscous, and the polymer adheres to the side wall of the reaction tank and the stirring blade. The adhered polymer remains in the reaction tank not melted in the subsequent batchwise productions, and therefore, the adhered amount is increased and the adhered polymer is subjected to heat history longer with increasing number of repeated batchwise productions. If the accumulated mass of adhered polymer falls and enters into the polymer, the quality of the resulting product is deteriorated and the stirring blade may be broken. Since the dew point of water is decreased with decreasing inner pressure, it is preferred to control the temperature of the vapor-side outlet of the partial condenser within a range from the dew point of water to a temperature 5° C. higher than the dew point.

After completing the addition of the diamine component, the pressure at the time the addition is completed is kept preferably for 5 min to 3 h and more preferably 10 min to one hour, while maintaining the whole reaction system in fluid state. At the initial stage of adding the diamine component, the carboxyl group exists in large excess to the diamine component and the reaction speed, i.e., the fixing speed of the diamine component is extremely high. Since a considerable amount of the carboxyl group is consumed at the time the addition is completed, the fixing speed of the diamine component is extremely low as compared with that at the initial stage of the addition. The efficiency of stirring the reaction mixture decreases with increasing degree of polymerization, this being disadvantageous for the fixation of the diamine component. The diamine component not fixed remains in the reaction mixture or in the vapor phase in the reaction system. The diamine component condensed in the partial condenser returns to the reaction mixture. By maintaining the pressure at the time the addition is completed for at least 5 min after completing the addition of the diamine component, the remaining diamine component is fixed and the mole balance of the initial charge is precisely reflected in the mole balance of the produced polyamide. The upper limit of the time for maintaining the pressure is not absolutely determined because it depends upon the degree of the fixation of the diamine component. However, no additional effect is obtained by maintaining the pressure longer than needed after completing the fixation of the diamine component, instead, the disadvantage, such as increase in heat history and reduction in productivity, is caused. Therefore, the pressure is maintained generally for 3 h or less.

After maintaining the pressure at the time the diamine addition is completed for a period within the above range, the inner pressure of the reaction tank is reduced to atmospheric pressure or lower at a pressure decreasing speed of 0.1 to 1.0 MPa/h. The pressure is reduced preferably to less than atmospheric pressure, more preferably to 80 kPaA or lower so as to remove the steam in the vapor phase from the reaction system, this shifting the amidation equilibrium to the product side to further increase the degree of polymerization. During the pressure reduction, the whole reaction system is kept in fluid state. The speed of decreasing the pressure is selected so as to avoid the foaming of the produced polyamide and is preferably 0.1 to 1.0 MPa/h, although depending upon the size of the reaction tank and the pressure before reducing. If higher than 1.0 MPa/h, the liquid surface rises due to the foaming and the polymer adheres to the side wall of the reaction tank, stirring blade, etc. In the subsequent batchwise production, the adhered polymer remains not melted in the reaction tank. Therefore, the adhered amount increases and the adhered polymer is exposed to heat longer with increasing number of repeated batchwise productions. If the adhered polymer removes from the wall or stirring blade and enters into the polymer, the quality of the resultant polyamide is reduced or the stirring blade may be broken. If lower than 0.1 MPa/h, the disadvantages, such as the yellowing of polyamide due to increased heat history and the reduction of productivity, are caused. To avoid these disadvantages, the pressure decreasing speed is preferably 0.3 to 0.6 MPa/h and more preferably 0.4 to 0.5 MPa/h.

After reducing the pressure, the produced polyamide is discharged from the reaction tank preferably under pressure of an inert gas, such as nitrogen. In the present invention, since the nylon salt and oligomer little remain in the reaction tank after discharging the produced polyamide, the reaction tank is readily used for the next batchwise reaction, thereby enabling the continuous batchwise production. The polyamide thus obtained may be subjected to a solid state polymerization for further polymerization to obtain a polyamide with a higher molecular weight. Alternatively, the polyamide obtained may be supplied to a continuous polymerization apparatus in molten state for further polymerization to obtain a polyamide with a higher molecular weight.

The polyamide produced by the production method of the invention may be blended with another resin, such as nylon 6, nylon 66, nylon 6,66, polyester, and olefin resin as long as the object of the invention is adversely affected. In addition, the polyamide may be blended with an additive, for example, an inorganic filler, such as glass fiber and carbon fiber; a plate inorganic filler, such as glass flake, talc, kaolin, mica, montmorillonite, and organized clay; an impact strength modifier, such as elastomers; a nucleating agent; a lubricant, such as an aliphatic carboxylic acid amide and a metal salt of aliphatic carboxylic acid; an antioxidant, such as a copper compound, an organic or inorganic halogen compound, a hindered phenol compound, a hindered amine compound, a hydrazine compound, a sulfur-containing compound, and a phosphorus-containing compound; a heat stabilizer; an anti-discoloration agent; an ultraviolet absorber, such as a benzotriazole compound; a mold release agent; a plasticizer; a colorant; a flame retardant; an oxygen scavenger, such as a cobalt-containing compound; and an anti-gelling agent for the copolyamide resin, such as an alkali compound.

EXAMPLES

The present invention is described in more detail with reference to the examples and comparative examples. However, it should be noted that the scope of the present invention is not limited by the following examples and comparative examples. Each method for analysis is described below.

(1) Terminal Amino Group Concentration

In 30 cc of a mixed solution of phenol/ethanol=4/1 by volume, 0.3 to 0.5 g of a polyamide resin accurately weighed was dissolved under stirring at 20 to 30° C. After completely dissolving, the terminal amino group concentration was determined by a neutralization titration using a N/100 hydrochloric acid under stirring.

(2) Terminal Carboxyl Group Concentration

In 30 cc of benzyl alcohol, 0.3 to 0.5 g of a copolyamide resin accurately weighed was dissolved in nitrogen stream at 160 to 180° C. under stirring. After completely dissolving, the solution was cooled to 80° C. or lower in nitrogen stream. After adding 10 cc of methanol under stirring, the terminal carboxyl group concentration was determined by a neutralization titration using a N/100 aqueous solution of sodium hydroxide.

(3) Number Average Molecular Weight

Calculated from the following formula:

Number Average Molecular Weight=2/([NH$_2$]+[COOH])

wherein [NH$_2$] is the terminal amino group concentration (μeq/g) and [COOH] is the terminal carboxyl group concentration (μeq/g).

(4) Yellowness (YI)

According to JIS K7103, the tristimulus values X, Y, and Z of the XYZ color system due to the reflection on a pelletized sample were measured using a color difference meter (Σ80 manufactured by Nippon Denshoku Industries Co., Ltd.). YI was calculated from the following formula:

$YI=100(1.28X-1.06Z)/Y$.

(5) Escaped Amount of Mixed Xylylenediamine

The concentration of the mixed xylylenediamine in the condensation water removed out of the reaction system during the production was measured using a gas chromatograph (GC-2010 manufactured by Shimadzu Corporation). The escaped amount of the mixed xylylenediamine was calculated from the weight of the condensation water removed.

Example 1

Into an oil-jacketed 50-L stainless reaction tank equipped with a partial condenser through which a temperature-controlled oil was to be passed, a total condenser, a stirring device, a nitrogen gas inlet, and an opening for dropping diamine, 15.000 kg of adipic acid (purity: 99.85 wt %) accurately weighed was charged and the inner atmosphere of the reaction tank was thoroughly replaced with nitrogen. The temperature was raised by passing a heating medium at 300° C. through the jacket to melt the adipic acid into fluid state under stirring. During the melting, the supply of nitrogen into the reaction tank was started to increase the inner pressure to 0.30 MPaG. When the temperature reached 190° C., 10.998 kg of a mixed xylylenediamine (purity: 99.95 wt %) of 70 mol % of m-xylylenediamine and 30 mol % of p-xylylenediamine was continuously added dropwise over one hour while stirring the molten adipic acid. The molar ratio (B/A) reached 0.788. During the addition, the pressure was kept at 0.30 MPaG to regulate the temperature of the vapor-side outlet of the partial condenser within a range of 144 to 147° C. Then, 2.896 kg of the mixed xylylenediamine was continuously added dropwise over 50 min. During the addition, the pressure was reduced from 0.30 MPaG to 0.06 MPaG at a decreasing speed of 0.72 MPa/h over 20 min while the molar ratio (B/A) was within 0.829 to 0.911, and the pressure was kept at 0.06 MPaG until the addition was completed. As the pressure was decreased, the temperature of the vapor-side outlet of the partial condenser was regulated within a range from the dew point of water to the dew point +5° C. During the continuous dropwise addition of the mixed xylylenediamine, the heating was regulated such that the temperature of the reaction liquid was continuously raised to 265° C. at the time the addition was completed, and the vapor generated by evaporation was condensed in the cooler and removed from the reaction system. After completing the dropwise addition of the mixed xylylenediamine, the inner pressure was kept at 0.06 MPaG for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 8 min. Then, the heating was stopped and the product was discharged from a nozzle at a lower portion of the reaction tank in the form of strand under pressure of nitrogen, which was then water-cooled and pelletized to obtain an amorphous polyamide resin having YI of −6. The quantitative analysis of the terminal group concentrations of the obtained polyamide showed that the molar ratio (B/A) was 0.994 and the number average molecular weight was 15,500. The amount of the mixed xylylenediamine escaped from the reaction system was 10 g. No adhered matter, such as nylon salt and oligomer, was observed in the reaction tank and the partial condenser. The overall production time taken from starting the addition of the mixed xylylenediamine until starting the discharge of the polymer was 2 h and 21 min.

Example 2

In the same manner as in Example 1, 10.998 kg of a mixed xylylenediamine (purity: 99.95 wt %) was continuously added dropwise over one hour. The molar ratio (B/A) reached 0.788. During the addition, the pressure was kept at 0.30 MPaG to regulate the temperature of the vapor-side outlet of the partial condenser within a range of 144 to 147° C. Then, 2.896 kg of the mixed xylylenediamine was continuously added dropwise over 50 min. During the addition, the pressure was reduced from 0.30 MPaG to 0.06 MPaG at a decreasing speed of 0.72 MPa/h over 20 min while the molar ratio (B/A) was within 0.866 to 0.949, and the pressure was kept at 0.06 MPaG until the addition was completed. As the pressure was decreased, the temperature of the vapor-side outlet of the partial condenser was regulated within a range from the dew point of water to the dew point +5° C. During the continuous dropwise addition of the mixed xylylenediamine, the heating was regulated such that the temperature of the reaction liquid was continuously raised to 265° C. at the time the addition was completed, and the vapor generated by evaporation was condensed in the cooler and removed from the reaction system. After completing the dropwise addition of the mixed xylylenediamine, the inner pressure was kept at 0.06 MPaG for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 8 min. Then, the heating was stopped and the product was discharged from a nozzle at a lower portion of the reaction tank in the form of strand under pressure of nitrogen, which was then water-cooled and pelletized to obtain an amorphous polyamide resin having YI of −6. The quantitative analysis of the terminal group concentrations of the obtained polyamide showed that the molar ratio (B/A) was 0.994 and the number average molecular weight was 15,500. The amount of the mixed xylylenediamine escaped from the reaction system was 10 g. No adhered matter, such as nylon salt and oligomer, was observed in the reaction tank and the partial condenser. The overall production time taken from starting the addition of the mixed xylylenediamine until starting the discharge of the polymer was 2 h and 21 min.

Example 3

Into an oil-jacketed 50-L stainless reaction tank equipped with a partial condenser through which a temperature-controlled oil was to be passed, a total condenser, a stirring device, a nitrogen gas inlet, and an opening for dropping diamine, 15.000 kg of adipic acid (purity: 99.85 wt %) accurately weighed was charged and the inner atmosphere of the reaction tank was thoroughly replaced with nitrogen. The temperature was raised by passing a heating medium at 300° C. through the jacket to melt the adipic acid into fluid state under stirring. During the melting, the supply of nitrogen into the reaction tank was started to increase the inner pressure to 0.30 MPaG. When the temperature reached 190° C., 8.422 kg of a mixed xylylenediamine (purity: 99.95 wt %) of 70 mol % of m-xylylenediamine and 30 mol % of p-xylylenediamine was continuously added dropwise over 47 min while stirring the molten adipic acid. The molar ratio (B/A) reached 0.603. During the addition, the pressure was kept at 0.30 MPaG to regulate the temperature of the vapor-side outlet of the partial condenser within a range of 144 to 147° C. Then, 5.474 kg of the mixed xylylenediamine was continuously added dropwise over 63 min. During the addition, the pressure was reduced from 0.30 MPaG to 0.12 MPaG at a decreasing speed of 0.54 MPa/h over 20 min while the molar ratio (B/A) was within 0.603 to 0.728, and the pressure was kept at 0.12 MPaG until the addition was completed. As the pressure was decreased, the temperature of the vapor-side outlet of the partial condenser was regulated within a range from the dew point of water to the dew point +5° C. During the continuous dropwise addition of the mixed xylylenediamine, the heating was regulated such that the temperature of the reaction liquid was continuously raised to 265° C. at the time the addition was completed, and the vapor generated by evaporation was condensed in the cooler and removed from the reaction system. After completing the dropwise addition of the mixed xylylenediamine, the inner pressure was kept at 0.12 MPaG for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 8 min. Then, the heating was stopped and the product was discharged from a nozzle at a lower portion of the reaction tank in the form of strand under pressure of nitrogen, which was then water-cooled and pelletized to obtain an amorphous polyamide resin having YI of −6. The quantitative analysis of the terminal group concentrations of the obtained polyamide showed that the molar ratio (B/A) was 0.994 and the number average molecular weight was 15,600. The amount of the mixed xylylenediamine escaped from the reaction system was 10 g. No adhered matter, such as nylon salt and oligomer, was observed in the reaction tank and the partial condenser. The overall production time taken from starting the addition of the mixed xylylenediamine until starting the discharge of the polymer was 2 h and 27 min.

Example 4

In the same manner as in Example 3, 8.422 kg of a mixed xylylenediamine (purity: 99.95 wt %) was continuously added dropwise over 47 min. The molar ratio (B/A) reached 0.603. During the addition, the pressure was kept at 0.30 MPaG to regulate the temperature of the vapor-side outlet of the partial condenser within a range of 144 to 147° C. Then, 5.474 kg of the mixed xylylenediamine was continuously added dropwise over 63 min. During the addition, the pressure was reduced from 0.30 MPaG to 0.10 MPaG at a decreasing speed of 0.22 MPa/h over 55 min while the molar ratio (B/A) was within 0.603 to 0.945, and the pressure was kept at 0.10 MPaG until the addition was completed. As the pressure was decreased, the temperature of the vapor-side outlet of the partial condenser was regulated within a range from the dew point of water to the dew point +5° C. During the continuous dropwise addition of the mixed xylylenediamine, the heating was regulated such that the temperature of the reaction liquid was continuously raised to 265° C. at the time the addition was completed, and the vapor generated by evaporation was condensed in the cooler and removed from the reaction system. After completing the dropwise addition of the mixed xylylenediamine, the inner pressure was kept at 0.10 MPaG for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 8 min. Then, the heating was stopped and the product was discharged from a nozzle at a lower portion of the reaction tank in the form of strand under pressure of nitrogen, which was then water-cooled and pelletized to obtain an amorphous polyamide resin having YI of −6. The quantitative analysis of the terminal group concentrations of the obtained polyamide showed that the molar ratio (B/A) was 0.994 and the number average molecular weight was 15,700. The amount of the mixed xylylenediamine escaped from the reaction system was 9 g. No adhered matter, such as nylon salt and oligomer, was observed. The overall production time taken from starting the addition of the mixed xylylenediamine until starting the discharge of the polymer was 2 h and 25 min.

Example 5

Into an oil-jacketed 50-L stainless reaction tank equipped with a partial condenser through which a temperature-controlled oil was to be passed, a total condenser, a stirring device, a nitrogen gas inlet, and an opening for dropping diamine, 15.000 kg of adipic acid (purity: 99.85 wt %) accurately weighed was charged and the inner atmosphere of the reaction tank was thoroughly replaced with nitrogen. The temperature was raised by passing a heating medium at 300° C. through the jacket to melt the adipic acid into fluid state under stirring. During the melting, the supply of nitrogen into the reaction tank was started to increase the inner pressure to 0.30 MPaG. When the temperature reached 190° C., 10.998 kg of a mixed xylylenediamine (purity: 99.95 wt %) of 70 mol % of m-xylylenediamine and 30 mol % of p-xylylenediamine was continuously added dropwise over 30 min while stirring the molten adipic acid. The molar ratio (B/A) reached 0.788. During the addition, the pressure was kept at 0.30 MPaG to regulate the temperature of the vapor-side outlet of the partial condenser within a range of 144 to 147° C. Then, 2.896 kg of the mixed xylylenediamine was continuously added dropwise over 50 min. During the addition, the pressure was reduced from 0.30 MPaG to atmospheric pressure at a decreasing speed of 0.46 MPa/h over 39 min while the molar ratio (B/A) was within 0.788 to 0.949, and the pressure was kept at atmospheric pressure until the addition was completed. As the pressure was decreased, the temperature of the vapor-side outlet of the partial condenser was regulated within a range from the dew point of water to the dew point +5° C. During the continuous dropwise addition of the mixed xylylenediamine, the heating was regulated such that the temperature of the reaction liquid was continuously raised to 265° C. at the time the addition was completed, and the vapor generated by evaporation was condensed in the cooler and removed from the reaction system. After completing the dropwise addition of the mixed xylylenediamine, the inner pressure was kept at atmospheric pressure for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 8 min. Then, the heating was stopped and the product was discharged from a nozzle at a lower portion of the reaction tank in the form of strand under pressure of nitrogen, which was then water-cooled and pelletized to obtain an amorphous polyamide resin having YI of −7. The quantitative analysis of the terminal group concentrations of the obtained polyamide showed that the molar ratio (B/A) was 0.993 and the number average molecular weight was 15,100. The amount of the mixed xylylenediamine escaped from the reaction system was 13 g. No adhered matter, such as nylon salt and oligomer, was observed in the reaction tank and the partial condenser. The overall production time taken from starting the addition of the mixed xylylenediamine until starting the discharge of the polymer was 1 h and 45 min.

Example 6

Into an oil-jacketed 50-L stainless reaction tank equipped with a partial condenser through which a temperature-controlled oil was to be passed, a total condenser, a stirring device, a nitrogen gas inlet, and an opening for dropping diamine, 15.000 kg of adipic acid (purity: 99.85 wt %) accurately weighed was charged and the inner atmosphere of the reaction tank was thoroughly replaced with nitrogen. The temperature was raised by passing a heating medium at 320° C. through the jacket to melt the adipic acid into fluid state under stirring. During the melting, the supply of nitrogen into the reaction tank was started to increase the inner pressure to 0.40 MPaG. When the temperature reached 190° C., 10.998 kg of a mixed xylylenediamine (purity: 99.95 wt %) of 50 mol % of m-xylylenediamine and 50 mol % of p-xylylenediamine was continuously added dropwise over one hour while stirring the molten adipic acid. The molar ratio (B/A) reached 0.788. During the addition, the pressure was kept at 0.40 MPaG to regulate the temperature of the vapor-side outlet of the partial condenser within a range of 151 to 155° C. Then, 2.896 kg of the mixed xylylenediamine was continuously added dropwise over 50 min. During the addition, the pressure was reduced from 0.40 MPaG to 0.07 MPaG at a decreasing speed of 0.51 MPa/h over 39 min while the molar ratio (B/A) was within 0.788 to 0.949, and the pressure was kept at 0.07 MPaG until the addition was completed. As the pressure was decreased, the temperature of the vapor-side outlet of the partial condenser was regulated within a range from the dew point of water to the dew point +5° C. During the continuous dropwise addition of the mixed xylylenediamine, the heating was regulated such that the temperature of the reaction liquid was continuously raised to 285° C. at the time the addition was completed, and the vapor generated by evaporation was condensed in the cooler and removed from the reaction system. After completing the dropwise addition of the mixed xylylenediamine, the inner pressure was kept at 0.07 MPaG for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 5 min. Then, the heating was stopped and the product was discharged from a nozzle at a lower portion of the reaction tank in the form of strand under pressure of nitrogen, which was then water-cooled and pelletized to obtain an amorphous polyamide resin having YI of −3. The quantitative analysis of the terminal group concentrations of the obtained polyamide showed that the molar ratio (B/A) was 0.994 and the number average molecular weight was 15,500. The amount of the mixed xylylenediamine escaped from the reaction system was 9 g. No adhered matter, such as nylon salt and oligomer, was observed in the reaction tank and the partial condenser. The overall production time taken from starting the addition of the mixed xylylenediamine until starting the discharge of the polymer was 2 h and 19 min.

Comparative Example 1

Into an oil-jacketed 50-L stainless reaction tank equipped with a partial condenser through which a temperature-controlled oil was to be passed, a total condenser, a stirring device, a nitrogen gas inlet, and an opening for dropping diamine, 15.000 kg of adipic acid (purity: 99.85 wt %) accurately weighed was charged and the inner atmosphere of the reaction tank was thoroughly replaced with nitrogen. The temperature was raised by passing a heating medium at 300° C. through the jacket to melt the adipic acid into fluid state under stirring. During the melting, the supply of nitrogen into the reaction tank was started to increase the inner pressure to 0.30 MPaG. When the temperature reached 190° C., 13.896 kg of a mixed xylylenediamine (purity: 99.95 wt %) of 70 mol % of m-xylylenediamine and 30 mol % of p-xylylenediamine was continuously added dropwise over 110 min while stirring the molten adipic acid. During the addition, the heating was regulated such that the temperature of the reaction liquid was continuously raised to 265° C. at the time the addition was completed, the pressure was kept at 0.30 MPaG to regulate the temperature of the vapor-side outlet of the partial condenser within a range of 144 to 147° C., and the vapor generated by evaporation was condensed in the cooler and removed from the reaction system. After completing the dropwise addition of the mixed xylylenediamine, the inner pressure was kept at 0.3 MPaG for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 8 min. Then, the heating was stopped and the product was discharged from a nozzle at a lower portion of the reaction tank in the form of strand under pressure of nitrogen, which was then water-cooled and pelletized to obtain an amorphous polyamide resin having YI of −6. The quantitative analysis of the terminal group concentrations of the obtained polyamide showed that the molar ratio (B/A) was 0.994 and the number average molecular weight was 15,600. The amount of the mixed xylylenediamine escaped from the reaction system was 10 g. No adhered matter, such as nylon salt and oligomer, was observed in the reaction tank and the partial condenser. The overall production time taken from starting the addition of the mixed xylylenediamine until starting the discharge of the polymer was 2 h and 45 min.

Comparative Example 2

In the same manner as in Example 1, during the addition of the mixed xylylenediamine, the pressure was reduced from 0.30 MPaG to 0.04 MPaG at a decreasing speed of 0.21 MPa/h over 74 min while the molar ratio (B/A) was within 0.328 to 0.949, and the pressure was kept at 0.04 MPaG until the addition was completed. As the pressure was decreased, the temperature of the vapor-side outlet of the partial condenser was regulated within a range from the dew point of water to the dew point +5° C. During the continuous dropwise addition of the mixed xylylenediamine, the heating was regulated such that the temperature of the reaction liquid was continuously raised to 265° C. at the time the addition was completed, and the vapor generated by evaporation was condensed in the cooler and removed from the reaction system. After completing the dropwise addition of the mixed xylylenediamine, the inner pressure was kept at 0.04 MPaG for 15 min by raising the temperature at a temperature raising speed of 0.2° C./min while continuing the stirring. Then, the inner pressure was reduced to 80 kPaA at a decreasing speed of 0.6 MPa/h and kept at 80 kPaA for 8 min. Then, the heating was stopped and the product was discharged from a nozzle at a lower portion of the reaction tank in the form of strand under pressure of nitrogen, which was then water-cooled and pelletized to obtain an amorphous polyamide resin having YI of −6. The quantitative analysis of the terminal group concentrations of the obtained polyamide showed that the molar ratio (B/A) was 0.990 and the number average molecular weight was 14,100. The amount of the mixed xylylenediamine escaped from the reaction system was 61 g, showing a considerable increase in the amount of the diamine component escaped from the reaction system. A large amount of nylon salt and oligomer adhered to the reaction tank surrounding the vapor phase, and the white solid matter was observed in the partial condenser.

What is claimed is:

1. A method of producing polyamide, comprising:
    (1) charging a dicarboxylic acid component into a batch-wise reaction tank equipped with a partial condenser and increasing an inner pressure of the reaction tank to 0.2 MPaG or higher;
    (2) adding a diamine component to the dicarboxylic acid component continuously or intermittently until a molar ratio (B/A) of the diamine component (B) to the charged dicarboxylic acid component (A) reaches 0.60, while maintaining the inner pressure of the reaction tank at 0.2 MPaG or higher and maintaining a whole reaction system in a fluid state;
    (3) reducing the inner pressure of the reaction tank to 0.1 MPaG or lower and atmospheric pressure or higher during the time when the molar ratio (B/A) of the diamine component (B) to the charged dicarboxylic acid component (A) is within a range of from 0.60 to 0.95, while maintaining the whole reaction system in a fluid state and adding the diamine component to the dicarboxylic acid component continuously or intermittently; and
    (4) after completing the adding in (3), maintaining the inner pressure of the reaction tank at the time when the adding in (3) is completed for from 5 minutes to 3 hours, while maintaining the whole reaction system in the fluid state,
    wherein
    the diamine component comprises 70 mol % or more of a xylylenediamine, and the xylylenediamine comprises 20 mol % or more of p-xylylenediamine, and
    polycondensation of the diamine component and the dicarboxylic acid component is conducted in the absence of a solvent.

2. The method of claim 1, wherein, in (2) and (3), a temperature of a vapor-side outlet of the partial condenser is maintained at 155° C. or lower and within a range from a dew point of water to a temperature 5° C. higher than the dew point.

3. The method of claim 1, wherein, in (2), the inner pressure of the reaction tank is regulated within a range of from 0.2 to 0.4 MPaG.

4. The method of claim 1, wherein the pressure is kept constant after increasing the inner pressure of the reaction tank to 0.2 MPaG or higher in (1) until the pressure is reduced in (3).

5. The method of claim 1, wherein the dicarboxylic acid component comprises 70 mol % or more of adipic acid.

6. The method of claim 1, wherein the xylylenediamine consists of m-xylylenediamine and p-xylylenediamine.

7. The method of claim 1, wherein, after (4), the inner pressure of the reaction tank is reduced to atmospheric pressure or lower.

8. The method of claim 7, wherein, after (4), the inner pressure of the reaction tank is reduced at a speed of from 0.1 to 1.0 MPa/h.

9. The method of claim 7, wherein, after (4), the inner pressure of the reaction tank is reduced to 80 kPa or lower.

10. The method of claim 9, wherein, after (4), the inner pressure of the reaction tank is reduced at a speed of from 0.1 to 1.0 MPa/h.

* * * * *